United States Patent
Little

(10) Patent No.: US 10,132,175 B2
(45) Date of Patent: Nov. 20, 2018

(54) ARRANGEMENT FOR A GAS TURBINE COMBUSTION ENGINE

(71) Applicant: Siemens Energy, Inc., Orlando, FL (US)

(72) Inventor: David A. Little, Mount Dora, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 0 days.

(21) Appl. No.: 15/509,987

(22) PCT Filed: Oct. 7, 2014

(86) PCT No.: PCT/US2014/059381
§ 371 (c)(1),
(2) Date: Mar. 9, 2017

(87) PCT Pub. No.: WO2016/057020
PCT Pub. Date: Apr. 14, 2016

(65) Prior Publication Data
US 2018/0230835 A1    Aug. 16, 2018

(51) Int. Cl.
*F01D 9/02* (2006.01)
*F23R 3/42* (2006.01)
(Continued)

(52) U.S. Cl.
CPC ............ *F01D 9/023* (2013.01); *F23R 3/42* (2013.01); *F23R 3/425* (2013.01); *F23R 3/46* (2013.01);
(Continued)

(58) Field of Classification Search
CPC .... F05D 2260/201; F01D 9/023; F01D 5/186; F23R 2900/03044; F23R 3/42; F23R 3/425; F23R 3/46; F02C 7/12; F02C 7/125
See application file for complete search history.

(56) References Cited

U.S. PATENT DOCUMENTS 7,270,175 B2   9/2007  Mayer et al.
8,015,817 B2   9/2011  Charron et al.
(Continued)

FOREIGN PATENT DOCUMENTS

EP    2573325 A1    3/2013
JP    2011232022 A  11/2011
(Continued)

OTHER PUBLICATIONS

PCT International Search Report and Written Opinion dated Apr. 14, 2015 corresponding to PCT Application No. PCT/US2014/059381 filed Oct. 7, 2014.

*Primary Examiner* — Carlos A Rivera
*Assistant Examiner* — Kyle Thomas

(57) ABSTRACT

An arrangement (10) for delivering gases from combustors (15) to a first row of blades. The arrangement (10) includes at least an upstream flow path (60) including an aft first side wall (64) and a downstream flow path (62) including a forward second side wall (66). A convergence junction trailing edge (40) is defined at a downstream terminal edge (41) of the first side wall (64), and the second side wall (66) converges toward the first side wall (64) in the direction of the convergence junction trailing edge (40). An impingement sheet structure (78) is located between and provides impingement cooling air to the first and second side walls (64, 66). Openings (88) provide a cooling air passage between the first and second side walls (64, 66) and provide a flow of post impingement air into the gas path at the convergence junction trailing edge (40).

13 Claims, 6 Drawing Sheets

(51) Int. Cl.
*F23R 3/46* (2006.01)
*F02C 7/12* (2006.01)

(52) U.S. Cl.
CPC .............. *F02C 7/12* (2013.01); *F02C 7/125* (2013.01); *F05D 2240/12* (2013.01); *F05D 2250/25* (2013.01); *F05D 2260/201* (2013.01); *F23R 2900/03044* (2013.01)

(56) References Cited

U.S. PATENT DOCUMENTS

| | | | |
|---|---|---|---|
| 8,113,003 | B2 | 2/2012 | Charron et al. |
| 8,500,405 | B1 | 8/2013 | Jones et al. |
| 2010/0037617 | A1* | 2/2010 | Charron ............... F01D 9/023 60/752 |
| 2010/0071382 | A1 | 3/2010 | Liang |
| 2010/0170259 | A1 | 7/2010 | Huffman |
| 2011/0123351 | A1 | 5/2011 | Hada et al. |
| 2012/0121381 | A1 | 5/2012 | Charron et al. |
| 2012/0121408 | A1* | 5/2012 | Lee ............... F01D 9/023 415/214.1 |
| 2012/0275900 | A1* | 11/2012 | Snider ............ F01D 9/023 415/108 |
| 2014/0109578 | A1* | 4/2014 | Bothien ............ F01D 9/023 60/722 |
| 2014/0109579 | A1* | 4/2014 | Dusing ............ F01D 9/023 60/722 |
| 2014/0338304 | A1* | 11/2014 | Schilp ............. F01D 9/023 60/39.23 |
| 2015/0114003 | A1* | 4/2015 | McMahan ............ F01D 5/141 60/796 |

FOREIGN PATENT DOCUMENTS

| | | |
|---|---|---|
| JP | 2013231426 A | 11/2013 |
| JP | 2014185633 A | 10/2014 |
| WO | 2012148675 A1 | 11/2012 |
| WO | 2014150437 A1 | 9/2014 |

\* cited by examiner

ARRANGEMENT FOR A GAS TURBINE COMBUSTION ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to gas turbine combustion engines. In particular, this invention relates to an assembly for transporting expanding gases to the first row of turbine blades in a turbine engine.

BACKGROUND OF THE INVENTION

A gas turbine engine typically includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products forming hot working gases that flow in a turbulent manner and at a high velocity. The working gases are routed to the turbine section via a plurality of gas passages, conventionally referred to as transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The gas passages are positioned adjacent to the combustors and route the working gases into the turbine section through turbine inlet structure associated with a first row of turbine vanes. The working gases expose the transition ducts and related components to high temperatures, requiring cooling of these components in order to prolong the life and reduce the likelihood of component failure as a result of excessive temperatures.

SUMMARY OF THE INVENTION

In accordance with one aspect of the invention an arrangement is provided for delivering gases from a plurality of combustors of a can-annular gas turbine combustion engine to a first row of turbine blades. The arrangement comprises a gas path cylinder, a cone, and an IEP for each combustor. Each IEP comprises a straight path portion for receiving a gas flow from a respective combustor via the cylinder and cone. The IEP further includes a connection location, wherein each IEP connects to an adjacent IEP at the connection location of the adjacent IEP, and the connected IEPs define an annular outlet structure that extends circumferentially and is oriented concentric to a gas turbine engine longitudinal axis, for delivering the gas flow to the first row of blades, wherein gases flow from respective combustors, through respective straight path portions, to the annular outlet structure. Each straight path portion defines a polygonal cross section forming a flow path comprising a radially outer wall opposite to a radially inner wall, and the radially outer and inner walls are coupled together with opposed forward and aft walls. The forward wall defines a continuous wall from an upstream end of the straight path portion to an exit end of the flow path. Adjacent straight path portions define circumferentially adjacent upstream and downstream flow paths, wherein the aft wall of the downstream flow path defines a first side wall that terminates at a convergence junction trailing edge and the forward wall of the upstream flow path defines a second side wall that converges toward the first side wall in the direction of the convergence junction trailing edge. An impingement sheet structure is located between and provides impingement cooling air to the first and second side walls. One or more openings provide a cooling air passage between the first and second side walls and provide a flow of post impingement air into the gas path at the convergence junction trailing edge.

The impingement sheet structure can include first and second sheet portions having inner surfaces engaged on the first and second side walls, respectively.

The first and second side walls can include ribs extending from planar surfaces, the ribs maintaining a spacing between the first and second sheet portions and the planar surfaces to define impingement chambers adjacent to the first and second side walls.

The first and second sheet portions can extend to downstream ends and the first and second side walls can meet at a wall apex adjacent to the convergence junction trailing edge, and a post impingement chamber may be defined between the first and second side walls extending from the downstream ends of the sheet portions to the wall apex, and post impingement air may pass into the post impingement chamber prior to flowing through the cooling air passage.

The sheet portions can have outer surfaces that are open to shell air provided as an air supply for combustion in the plurality of combustors, and the sheet portions can have impingement holes for passage of shell air as impingement cooling air against the first and second side walls.

A thickness of at least one of the first and second side walls can taper to a reduced thickness along the length of the post impingement chamber to the convergence junction trailing edge.

Each of the first and second side walls can include an elongated rib located adjacent to the post impingement chamber and having an elongated dimension extending in an upstream to downstream direction, and can include a movable seal extending between the elongated ribs and defining an upstream end of the post impingement chamber.

Cooling air passages can be provided extending through each of the ribs and provide a flow of post impingement air from the impingement chambers to the post impingement chamber.

Film cooling holes can be provided through the first and second side walls, and provide film cooling air from the impingement chambers to sides of the first and second side walls that are exposed to the gas flow.

A downstream portion of the second side wall can be formed integral with an IEP that defines the downstream flow path including the first side wall, and the second side wall can have a downstream edge that terminates upstream of a downstream edge of the first side wall.

The second side wall can include an upstream portion formed integral with an IEP that defines the upstream flow path and the upstream portion of the second side wall can be located adjacent to the downstream portion of the second side wall, and a movable seal can be provided positioned between the upstream and downstream portions of the second side wall.

In accordance with another aspect of the invention, an arrangement is provided for delivering gases from a plurality of combustors of a can-annular gas turbine combustion engine to an annular outlet structure that extends circumferentially and is oriented concentric to a gas turbine engine longitudinal axis for delivering a gas flow to a first row of blades. The arrangement includes at least an upstream flow path and a downstream flow path located circumferentially adjacent to each other, the downstream flow path including an aft first side wall and the upstream flow path including a forward second side wall. A convergence junction trailing edge is defined at a downstream terminal edge of the first side wall, and the second side wall converges toward the first side wall in the direction of the convergence junction trailing edge. An impingement sheet structure is located between and provides impingement cooling air to the first and second side walls. One or more openings provide a cooling air passage between the first and second side walls and provide a flow of post impingement air into the gas path at the convergence junction trailing edge.

The first and second side walls can each include a hot side exposed to gas flow and an opposite cold side receiving impingement cooling air from the impingement sheet structure, and the cold side of the first side wall can be located facing the cold side of the second side wall.

An open area can be provided between the cold sides of the first and second side walls, and the open area can be open to a combustor shell providing shell air as impingement cooling air through impingement holes in the impingement sheet structure.

The impingement sheet structure can include first and second sheet portions having inner surfaces engaged on the cold sides of the first and second side walls, respectively.

The cold sides of the first and second side walls can include ribs extending from planar surfaces, the ribs can maintain a spacing between the first and second sheet portions and the planar surfaces to define impingement chambers adjacent to the first and second side walls.

The first and second sheet portions can extend to downstream ends and the first and second side walls can meet at a wall apex adjacent to the convergence junction trailing edge, and a post impingement chamber can be defined between the first and second side walls extending from the downstream ends of the sheet portions to the wall apex, and post impingement air can pass into the post impingement chamber prior to flowing through the cooling air passage. A thickness of at least one of the first and second side walls can taper to a reduced thickness along the length of the post impingement chamber to the convergence junction trailing edge.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

One assembly of a system for delivery of hot working gases from combustors to a turbine section of a gas turbine engine, in accordance with an aspect of the invention, orients combustor cans of a gas turbine engine in a tangential arrangement. In particular, combustor cans of a can-annular combustor are each oriented to direct a hot working gas flow through an assembly of components defining gas passages that direct the individual gas flows in a radially inward and circumferentially angled direction to a common exit annulus immediately upstream and adjacent a first row of turbine blades in a turbine section of the engine. For example, the arrangement of gas passages providing a flow to the exit annulus may generally correspond to a structure for supplying a flow of gases directly to a first row of turbine blades, without a need for row one turbine vanes. The exit annulus comprises a plane perpendicular to a longitudinal axis of the engine, where the gas flows to the first row of turbine blades.

Figure 1:
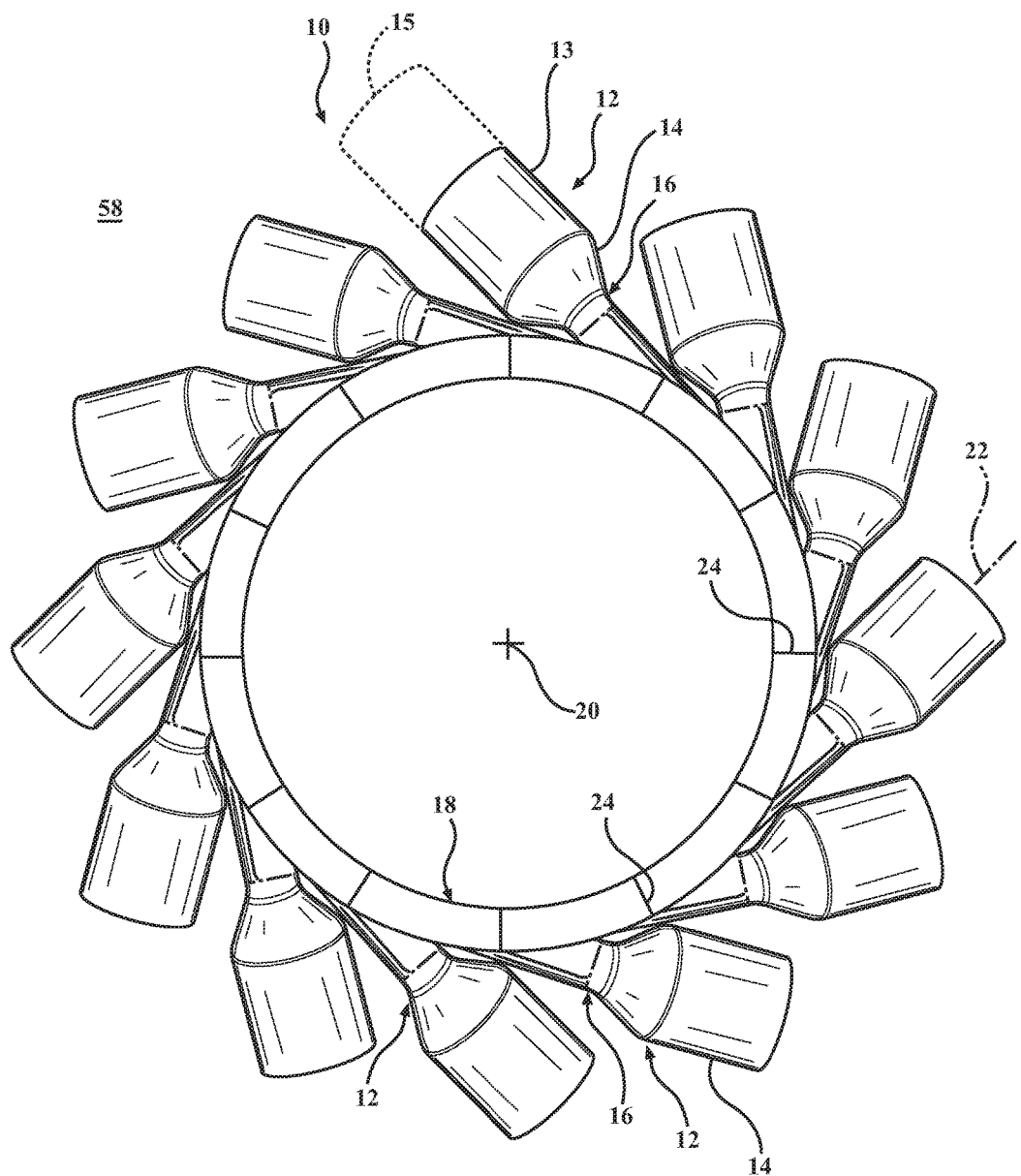
FIG. 1 is an axial view, directed from aft to forward in a gas turbine engine, of an assembled arrangement for delivering combustion gases to a first row of blades in accordance with aspects of the invention.

Referring to FIG. 1, an axial view of the arrangement 10 for delivering gases from a plurality of combustors of a can-annular gas turbine combustion engine to a first row of turbine blades is illustrated, as viewed in the forward direction. As referred to herein, a forward view means looking from the exhaust end toward the inlet end along the gas turbine engine longitudinal axis, and aft view means the opposite direction. When speaking of flows, forward refers to an engine inlet side, and aft refers to an engine exhaust side with respect to the longitudinal axis of the gas turbine engine. Inner and outer refer to radial positions with respect to the gas turbine engine longitudinal axis. Adjacent refers to items circumferentially adjacent with respect to the gas turbine longitudinal axis. In the disclosed embodiment, the gas turbine engine rotates counterclockwise when looking in the aft direction, i.e. when looking from the forward end to the aft end with respect to the gas turbine longitudinal axis. However, the entire disclosure is also considered to encompass gas turbine engines that rotate clockwise when looking in the aft direction, and the components described and illustrated herein would simply be reoriented. Upstream in this embodiment means upstream with respect to the direction of rotation of the gas turbine engine. Downstream means downstream with respect to the direction of rotation of the gas turbine engine. Thus, during rotation, a blade would encounter an upstream component of the assembled arrangement before encountering a downstream component.

The arrangement 10 comprises multiple sets of flow directing structures 12. There is a flow directing structure 12 for each combustor (one combustor 15 illustrated diagrammatically in FIG. 1). The combustion gases from each combustor flow into a respective flow directing structure 12. Each flow directing structure can include a gas flow cylinder 13, a cone section 14 and an integrated exit piece 16 (hereinafter referred to as an "IEP"). A plurality of IEPs 16 are provided, one for each combustor 15, and the plurality of IEPs 16 are connected to form the arrangement 10 defining an annular structure forward of the turbine section. The annular structure formed by the plurality of IEPs 16 is hereinafter referred to as an exit annulus 18. Each gas flow enters the exit annulus 18 at discrete intervals circumferentially at an orientation that includes a circumferential component and an axial component with respect to the gas turbine engine longitudinal axis 20. Each gas flow originates in its respective combustor can and is directed as a discrete flow to the annular chamber 18. When discrete, each flow is separated by walls, but upon entering the exit annulus 18 the flows are not separated by walls. The flows are still radially constrained at the exit annulus 18, but they are not separated from each other. Each IEP 16 abuts an adjacent IEP 16 at IEP joints 24.

Immediately aft of the exit annulus 18 is the first row of turbine blades (not shown). The exit annulus 18 eliminates any walls that separate the flows just before entering the turbine section, and also eliminates the first row of flow directing vanes that divide the flows. That is, once in the exit annulus 18, the walls that defined the forward and aft sides of each flow upstream cease to do so. In addition, the walls that define the inner and outer sides of the flow can be configured to transition from straight walls to arcuate walls that partially define the exit annulus 18.

Figure 2A:
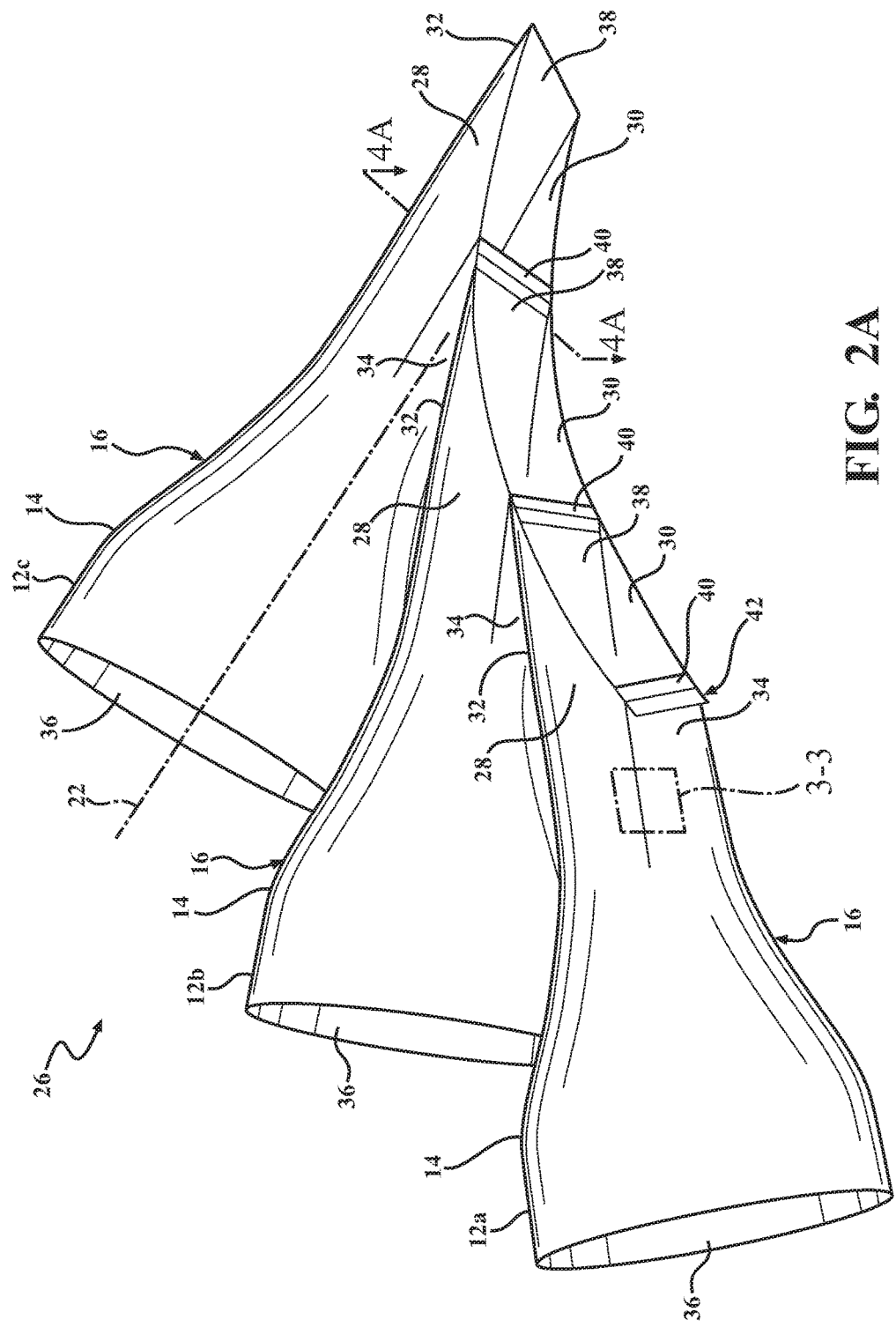
FIG. 2A is a perspective view of a partial arrangement of the arrangement of FIG. 1.

Referring to FIG. 2A, a partial arrangement 26 of the arrangement 10 is illustrated showing three adjacent flow directing structures, which for purposes of this discussion are referred to as an upstream flow directing structure 12a, a middle flow directing structure 12b, and a downstream flow directing structure 12c. The IEPs 16 of the flow directing structures 12 can comprise a straight flow path including the cone section 14 and extending along a flow axis 22 of each flow directing structure 12. Each IEP 16 can be formed with a polygonal cross section, and includes a radially outer wall 28, an opposite radially inner wall 30, and respective opposing forward and aft walls 32, 34 (see also FIG. 4A) extending radially between the outer and inner walls 28, 30. The forward wall 32 can form a continuous wall from an upstream end 36 of the straight flow path to an exit end 38 of the flow path. The aft wall 34 extends to a downstream termination location defined as a convergence junction trailing edge 40, as is described further below.

The IEPs 16 can further comprise a connection segment 42 defining a connection location for connecting to an adjacent IEP 16. That is, the connection segment may be cast in place and formed integrally with an IEP 16 adjacent to a downstream portion of the aft wall 34. The connection segment 42 can extend upstream from the convergence junction trailing edge 40, as is described in greater detail below with reference to FIG. 4A.

Figure 2B:
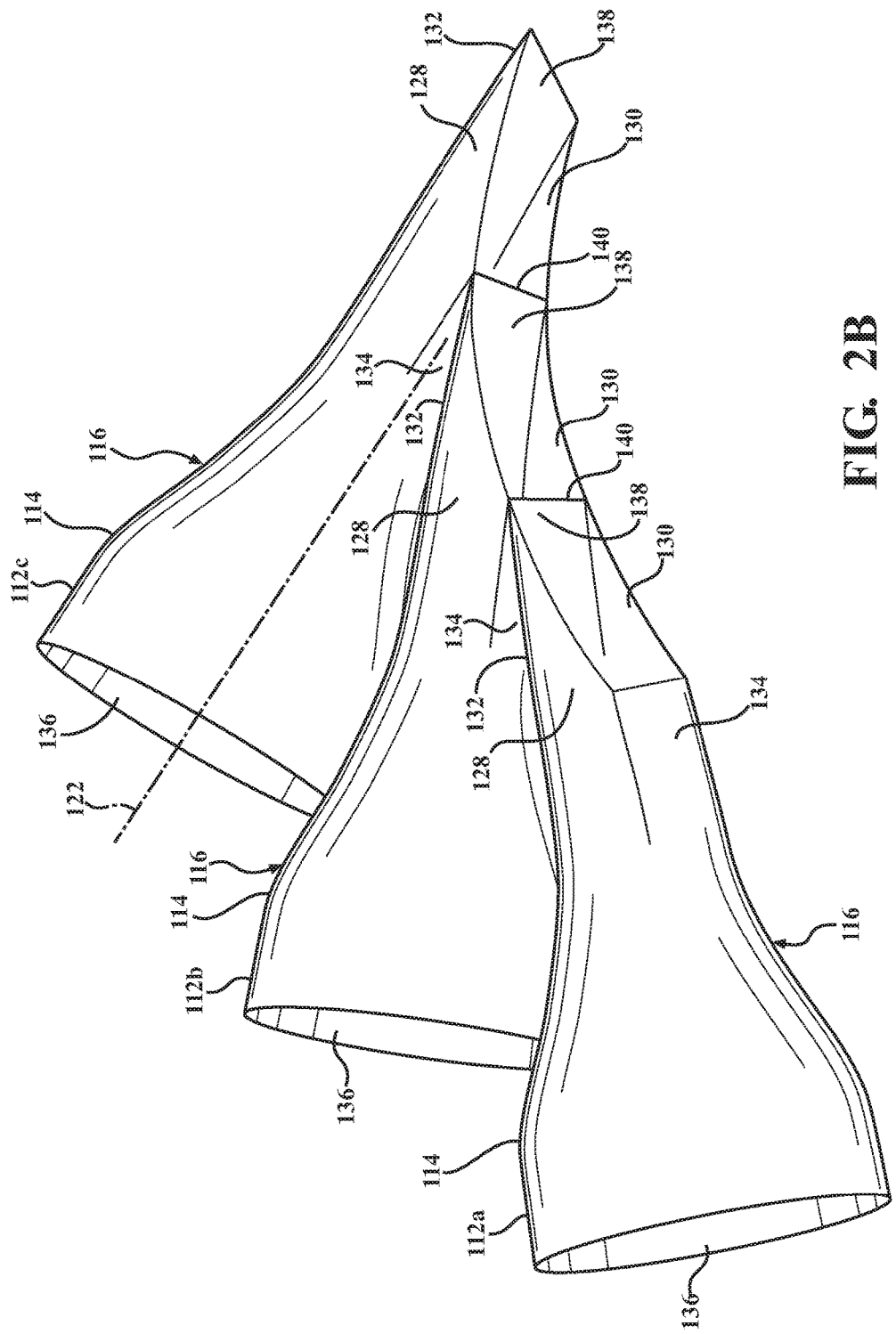
FIG. 2B is a perspective view of a partial arrangement of the arrangement of FIG. 1 illustrating an alternative configuration to that illustrated in FIG. 2A.
Figure 3A:
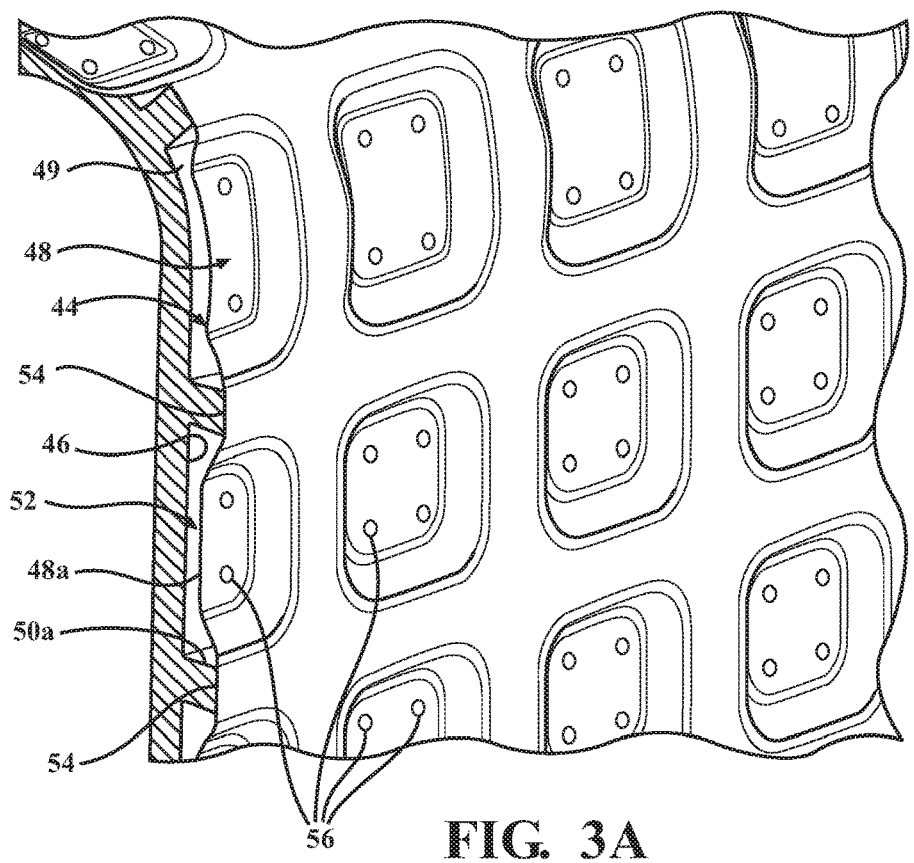
FIG. 3A is a perspective cut-away section view, taken at area 3-3 in FIG. 2A, illustrating an outer cooling structure for an individual exit piece (IEP)

Referring to FIG. 3A, a cut-away section of an IEP 16 is illustrated, and can correspond generally to an area 3-3 on the IEP 16, as identified in FIG. 2A. It may be understood that the following discussion relating to the area 3-3 can be equally applicable to any portion of the IEP 16 or flow directing structure 12. Further, it should be understood that the surfaces of the components of the flow directing structures 12 illustrated in FIGS. 1 and 2 are depicted generically but may be understood to include the outer surface configuration described herein.

Figure 3B:
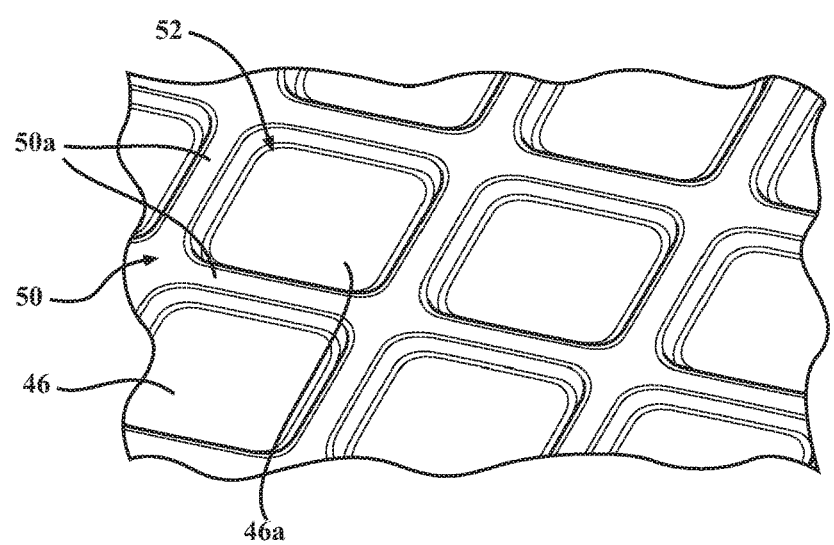
FIG. 3B is an enlarged perspective view of an outer surface of an IEP, corresponding to the structure illustrated in FIG. 3A with an impingement sheet removed.

As seen in FIG. 3A, an outer surface of the IEP 16 is identified by reference 44 and can include a surface 46 of the IEP 16 and an impingement sheet 48 positioned over the surface 46. The surface 46 is defined as a generally planar surface and has a rectangular grid of ribs 50a defining a rib structure 50 extending outward from the surface 46, as can be seen in FIG. 3B in which a portion of area 3-3 is illustrated with the impingement sheet 48 removed. It may be understood that the term "planar" describes a local surface 46, such as one surrounded by a rectangular arrangement of the ribs 50a to define the local surface as an impingement surface 46a within an impingement cavity 52. In addition, the surface 46 may include locally curved sections, as is depicted at 49 (FIG. 3A), forming a radiused joint between adjacent walls of the IEP 16. The impingement sheet 48 can be attached to the IEP 16 at outer ends 54 of the ribs 50a and can include inward located portions 48a that extend into the impingement cavity 52. Further, the inward located portions 48a can include impingement holes 56. It may be understood that the components of the flow directing structure 12 extend through a combustor shell 58 (see FIG. 1) containing shell air discharged from the compressor section of the engine as a source of air for the combustors 15. The impingement holes 56 in the impingement sheet permit passage of the shell air into the impingement cavities 52 to impingement on and cool the IEP 16 at the impingement surfaces 46a.

In accordance with an aspect of the invention, it has been noted that the convergence junction trailing edge 40 (hereinafter referred to as "trailing edge 40") is located at the downstream end of a tapering structure that is subjected to high temperature gas flows at both sides of the tapering structure, as provided by flows in adjacent upstream and downstream IEPs 16. Further, the outer surfaces 46 of the adjacent IEPs 16 at the trailing edge 40 face each other in close proximity to each other, and can form a restriction that may prevent cooling air from effectively contacting and transferring heat from the trailing edge 40.

Figure 4A:
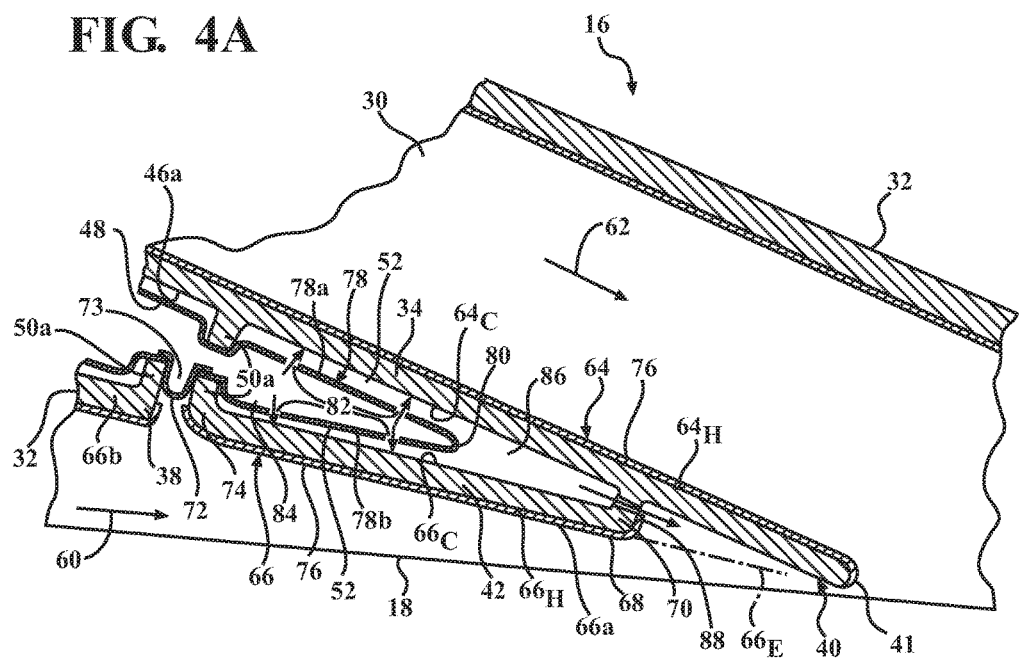
FIG. 4A is a cross-section view, taken at line 4A-4A in FIG. 2A, illustrating a configuration for a structure providing cooling to a trailing edge formed between two IEPs.

FIG. 4A illustrates a cooling configuration for the trailing edge 40 in accordance with aspects of the invention. The trailing edge 40 is formed at the convergence of an upstream flow path 60 and a downstream flow path 62. In particular, the trailing edge 40 is defined by a first side wall 64, corresponding to the aft wall 34 of the downstream flow path 62, and a second side wall 66 that converges toward the first side wall 64 in the direction of the trailing edge 40. The first side wall 64 terminates at a downstream-most end 41 of the first side wall 64 defining the trailing edge 40.

The second side wall 66 can include a downstream portion 66a and an adjacent upstream portion 66b, wherein the downstream portion 66a is formed integral with the IEP 16 that defines the downstream flow path 62. The upstream portion 66b is defined by a portion of the forward wall 32 at the exit end 38 of the IEP 16 that defines the upstream flow path 60. The downstream portion 66a can correspond to the connection segment 42 and includes a downstream end 68 that defines an intersection of the second side wall 66 with the first side wall 64 at a wall apex 70. A pressure loaded spring seal 72 is positioned at a joint 73 between the exit end 38 of the IEP 16 (the upstream portion 66*b*) and an upstream end 74 of the downstream portion 66*a*. The spring seal 72 can be positioned against ribs 50*a* located adjacent to the joint 73, and forms a seal at the joint to separate the hot gas flow in the upstream flow path 60 on one side of the spring seal 72 from shell air on an opposing side of the spring seal 72. It may be understood that the spring seal 72 forms a movable seal that can accommodate relative movement between the adjacent IEPs 16, such as may result from vibrations and differential thermal expansion.

The first side wall 64 includes a hot side 64$_H$ facing toward the downstream flow path 62, and an opposing cold side 64$_C$ corresponding to the impingement surface 46*a* of the IEP 16 as described above. Similarly, the second side wall 66 includes a hot side 66$_H$ facing toward the upstream flow path 60, and an opposing cold side 66$_C$ corresponding to the impingement surface 46*a* of the IEP 16. The hot sides 64$_H$, 66$_H$ of the first and second side walls 64, 66 can be provided with a thermal barrier coating 76.

An impingement sheet structure 78 is located between the cold sides 64$_C$, 66$_C$ of the first and second side walls 64, 66 and is positioned in spaced relation to each of the cold sides 64$_C$, 66$_C$. The impingement sheet structure 78 includes first and second sheet portions 78*a*, 78*b* that can be supported to one or more ribs 50*a* on the cold sides 64$_C$, 66$_C$, and that extend parallel to the adjacent cold sides 64$_C$, 66$_C$ and meet at a sheet apex 80. The sheet portions 78*a*, 78*b* can comprise a separate clip structure, or can be continuations of the impingement sheets 48 for respective IEPs 16, and include impingement holes 82 for impingement cooling the cold sides 64$_C$, 66$_C$ along impingement chambers or cavities 52. That is, an internal area 84 is defined between outer surfaces of the impingement sheets 78*a*, 78*b*, and the open area 84 is open to the combustor shell to receive the shell air as a source of cooling impingement air that flows through the impingement holes 82 and impinges on the cold sides 64$_C$, 66$_C$.

A post impingement chamber 86 is defined between the first and second side walls 64, 66 extending from the downstream ends of the sheet portions 78*a*, 78*b*, at the sheet apex 80, to the wall apex 70. Post impingement air passes into the post impingement chamber 86 after impinging on the cold sides 64$_C$, 66$_C$ and then passes through a cooling air passage 88 along the trailing edge 40. The cooling air passage 88 may be defined by one or more openings including one or more slots or holes.

It may be noted that the downstream end 68 of the downstream portion 66*a* of the second side wall 66 terminates upstream of the downstream terminal end 41 of the first side wall 64 defining the trailing edge 40. This configuration provides a single wall thickness, i.e., the first side wall 64, forming the trailing edge 40 as a thin tapered structure to reduce or minimize aerodynamic losses at the convergence of the flows from the upstream and downstream flow paths 60, 62. Additionally, an imaginary downstream extension 66$_E$ aligned with the hot side 66$_H$ of the second wall 66 can intersect the downstream terminal end 41 of the first side wall 64, and the cooling air flow from the cooling air passage 88 can flow along at least a portion of a space between the imaginary downstream extension 66$_E$ and the first side wall 64, i.e., along the downstream end of the first side wall 64, to provide a convective cooling air flow along the first side wall 64.

Figure 4B:
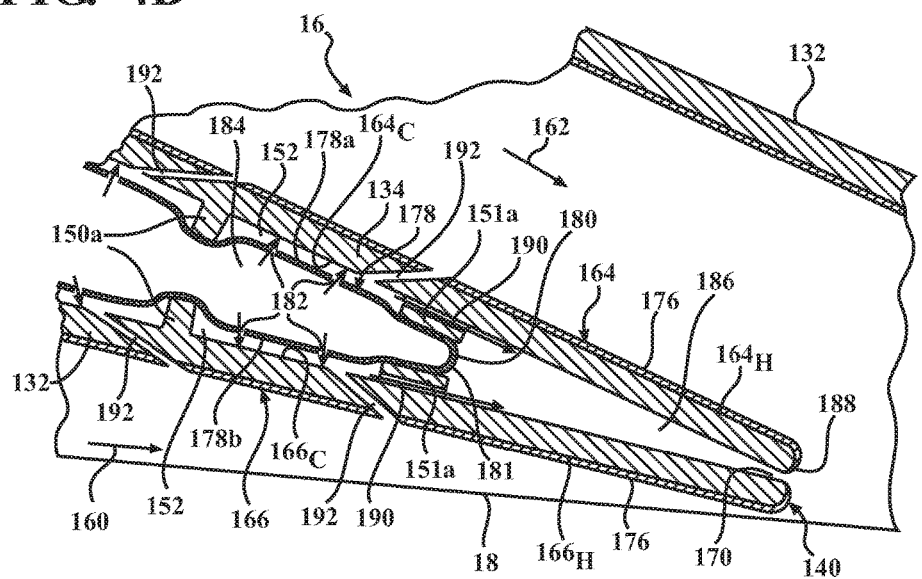
FIG. 4B is a view similar to FIG. 4A illustrating an alternative configuration corresponding to FIG. 2B for a structure providing cooling to a trailing edge formed between two IEPs.

FIGS. 2B and 4B illustrate a cooling configuration for a trailing edge 140 in accordance with a further aspect of the invention. Elements of FIGS. 2B and 4B corresponding to elements of FIGS. 2A and 4A are labeled with the same reference numeral increased by 100. Referring to FIG. 2B, a partial arrangement 126 similar to the partial arrangement 26 of FIG. 2A is illustrated showing three adjacent flow directing structures, which for purposes of this discussion are referred to as an upstream flow directing structure 112*a*, a middle flow directing structure 112*b*, and a downstream flow directing structure 112*c*. The IEPs 116 of the flow directing structures 112 can comprise a straight flow path including the cone section 114 and extending along a flow axis 122 of each flow directing structure 112. Each IEP 116 can be formed with a polygonal cross section, and includes a radially outer wall 128, an opposite radially inner wall 130, and respective opposing forward and aft walls 132, 134 (see also FIG. 4B) extending radially between the outer and inner walls 128, 130. The forward wall 132 can form a continuous wall from an upstream end 136 of the straight flow path to an exit end 138 of the flow path.

In FIG. 4B, a convergence junction trailing edge 140 is formed at the convergence of an upstream flow path 160 and a downstream flow path 162. In particular, the trailing edge 140 is defined by a first side wall 164, corresponding to the aft wall 134 of the downstream flow path 162, and a second side wall 166 corresponding to the forward wall 132 of the upstream flow path 160 that converges toward and meets the first side wall 164 at a wall apex 170 defining the trailing edge 140. The first and second side walls 164, 166 terminate at a downstream-most end defining the trailing edge 140.

The first side wall 164 includes a hot side 164$_H$ facing toward the downstream flow path 162, and an opposing cold side 164$_C$ corresponding to the impingement surface 46*a* of the IEP 16 as described above with reference to FIGS. 3A and 3B. Similarly, the second side wall 166 includes a hot side 166$_H$ facing toward the upstream flow path 160, and an opposing cold side 166$_C$ corresponding to the impingement surface 46*a* of the IEP 16. The hot sides 164$_H$, 166$_H$ of the first and second side walls 164, 166 can be provided with a thermal barrier coating 176.

An impingement sheet structure 178 is located between the cold sides 164$_C$, 166$_C$ of the first and second side walls 164, 166 and is positioned in spaced relation to each of the cold sides 164$_C$, 166$_C$. The impingement sheet structure 178 includes first and second sheet portions 178*a*, 178*b* that can be supported to one or more ribs 150*a*, 151*a* on the cold sides 164$_C$, 166$_C$, and that extend parallel to the adjacent cold sides 164$_C$, 166$_C$ and meet at a sheet apex 180. In the present embodiment, the sheet apex 180 can be defined by a separate pressure loaded spring seal 181 that defines a seal between opposing ribs 151*a* on the cold sides 164$_C$, 166$_C$. The ribs 151*a* can be defined as elongated ribs, i.e., elongated in the upstream to downstream direction, for supporting the spring seal 181. It may be understood that the spring seal 181 forms a movable seal at a connection location between the adjacent IEPs 116 that can accommodate relative movement between the adjacent IEPs 116, such as may result from vibrations and differential thermal expansion between the IEPs 116. Further, it should be noted that the function of the spring seal 181 could be performed by other types of seals including, for example, a brush seal, a dogbone seal, or any other kind of compliant seal.

The sheet portions 178*a*, 178*b* can be continuations of the impingement sheets 48 for respective IEPs 16(116), as described with reference to FIG. 3A, and include impingement holes 182 for impingement cooling the cold sides 164$_C$, 166$_C$ along impingement chambers or cavities 152. An internal area 184 between the impingement sheets 178*a*, 178b is open to the combustor shell to receive the shell air as a source of cooling impingement air that flows through the impingement holes 182 and impinges on the cold sides $164_C$, $166_C$.

A post impingement chamber 186 is defined between the first and second side walls 164, 166 extending from the sheet apex 180, defined by the spring seal 181, to the wall apex 170. Cooling air passages 190 extend through each of the elongated ribs 151a to connect the impingement chambers 152 to the post impingement chamber 186, such that at least a portion of post impingement air can flow from the impingement chambers 152 to the post impingement chamber 186. In addition, film cooling holes 192 may be defined through the first and second side walls 164, 166 and provide film cooling air comprising a portion of the post impingement air from the impingement chambers 152 to the hot sides $164_H$, $166_H$ of the first and second side walls 164, 166.

Post impingement air passing through the ribs 151a into the post impingement chamber 186 after impinging on the cold sides $164_C$, $166_C$ subsequently passes through a cooling air passage 188 along the trailing edge 140. The cooling air passage 180 may be defined by one or more openings including one or more slots or holes. It may be noted that the post impingement air in the post impingement chamber 186 can provide a flow of cooling air along the downstream length of both the first and second side walls 164, 166 to the end of the trailing edge 140 at the cooling air passage 188 where the spent cooling air is discharged into the hot gas flow.

Figure 4C:
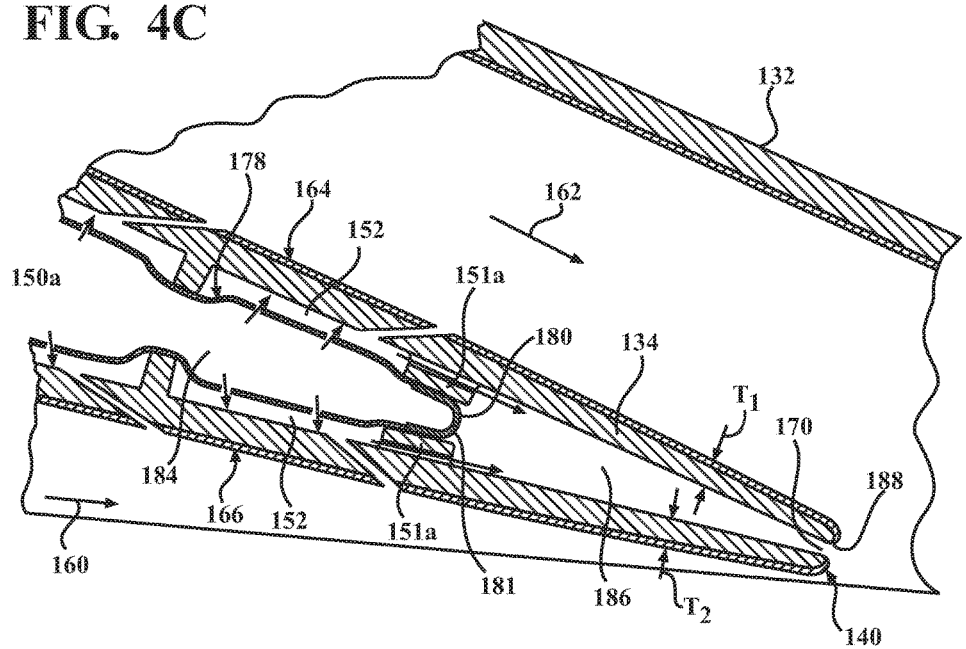
FIG. 4C illustrates an alternative structure for the configuration of FIG. 4B.

An alternative to the configuration of FIG. 4B is shown in FIG. 4C in which the cooling configuration for a trailing edge 140 is essentially the same except for a variation in the downstream ends of the first and second side walls 164, 166. Specifically, the first side wall 164 can define a first wall thickness $T_1$ and the second side wall 166 can define a second wall thickness $T_2$, wherein a thickness $T_1$, $T_2$ of the first and second side walls 164, 166 tapers to a reduced thickness along the length of the post impingement chamber 186, from approximately adjacent to the sheet apex 180 to the wall apex 170 of the trailing edge 140. For example, the wall thickness of each of the first and second walls 164, 166 can taper to the trailing edge 140 from a full thickness at the location of the impingement chambers 152 to a trailing edge thickness or width of about one-half of the full thickness. The reduced thickness at the trailing edge 140 can reduce any aerodynamic losses at the end of the trailing edge 140 where the flows of the first and second flow paths 160, 162 converge. Further, it may be understood that a similar tapered trailing edge could be provided to the trailing edge 40 disclosed with reference to FIG. 4A, such as could be provided by a tapering wall thickness of the first side wall 64 extending from the cooling air passage 88 to the terminal end 41 of the first side wall 64.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An arrangement for delivering gases from a plurality of combustors of a can-annular gas turbine combustion engine to an annular outlet structure that extends circumferentially and is oriented concentric to a gas turbine engine longitudinal axis for delivering a gas flow to a first row of blades, the arrangement is a tangential flow arrangement including at least an upstream flow path and a downstream flow path located circumferentially adjacent to each other, the downstream flow path including an aft first side wall and the upstream flow path including a forward second side wall;
a convergence junction trailing edge defined at a downstream terminal edge of the aft first side wall, and the forward second side wall converging toward the aft first side wall in the direction of the convergence junction trailing edge;
an impingement sheet structure located between and providing impingement cooling air to the aft first and forward second side walls;
wherein the aft first and forward second side walls each include a hot side exposed to the gas flow and an opposite cold side receiving the impingement cooling air from the impingement sheet structure, the cold side of the aft first side wall is located facing the cold side of the forward second side wall;
wherein the impingement sheet structure includes first and second sheet portions having inner surfaces engaged on the cold sides of the aft first and forward second side walls, respectively, wherein the first and second sheet portions extend to downstream ends and the first and second side walls meet at a wall apex adjacent to the convergence junction trailing edge;
one or more openings providing a cooling air passage between the aft first and forward second side walls and providing a flow of post impingement air into the gas flow at the convergence junction trailing edge; and
a post impingement is defined between the aft first and forward second side walls extending from the downstream ends of the sheet portions to the wall apex, and Post impingement air passes into the post impingement chamber prior to flowing through the cooling air passage.

2. The arrangement of claim 1, including an open area between the cold sides of the aft first and forward second side walls, the open area being open to a combustor shell providing shell air as the impingement cooling air through impingement holes in the impingement sheet structure.

3. The arrangement of claim 1, wherein the cold sides of the aft first and forward second side walls include ribs extending from planar surfaces, the ribs maintaining a spacing between the first and second sheet portions and the planar surfaces to define impingement chambers adjacent to the aft first and forward second side walls.

4. The arrangement of claim 1, wherein a thickness of at least one of the at first and forward second side walls tapers to a reduced thickness along a length of the post impingement chamber to the convergence junction trailing edge.

5. An arrangement for delivering gases from a plurality of combustors of a can-annular gas turbine combustion engine to a first row of turbine blades, the arrangement being a tangential flow arrangement comprising a gas path cylinder, a cone, and an individual exit piece (IEP) for each combustor, wherein each IEP comprises a straight path portion for receiving a gas flow from a respective combustor via the cylinder and cone, and the IEP further includes a connection location, wherein each IEP connects to an adjacent IEP at the connection location of the adjacent IEP, and the connected IEPs define an annular outlet structure that extends circumferentially and is oriented concentric to a gas turbine engine longitudinal axis, for delivering the gas flow to the first row of blades; wherein gases flow from respective combustors, through respective straight path portions, to the annular outlet structure;

each straight path portion defines a polygonal cross section forming a flow path comprising a radially outer wall opposite to a radially inner wall, and the radially outer and inner walls are coupled together with opposed forward and aft walls, the forward wall defining a continuous wall from an upstream end of the straight path portion to an exit end of the flow path;

adjacent straight path portions defining circumferentially adjacent upstream and downstream flow paths, wherein the aft wall of the downstream flow path defines a first side wall that terminates at a convergence junction trailing edge and the forward wall of the upstream flow path defines a second side wall that converges toward the first side wall in the direction of the convergence junction trailing edge;

an impingement sheet structure located between and providing impingement cooling air to the first and second side walls and comprising first and second sheet portions having inner surfaces engaged on the first and second sidewalls, respectively;

wherein the first and second sheet portions extend to downstream ends and the first and second side walls meet at a wall apex adjacent to the convergence junction trailing edge;

wherein the first and second side walls include ribs extending from Planar surfaces, the ribs maintaining a spacing between the first and second sheet portions and the planar surfaces to define impingement chambers adjacent to the first and second side walls;

one or more openings providing a cooling air passage between the first and second side walls and providing a flow of post impingement air into the gas flow at the convergence junction trailing edge; and a post impingement chamber is defined between the first and second side walls extending from the downstream ends of the sheet Portions to the wall apex, and post impingement air passes into the post impingement chamber prior to flowing through the cooling air passage.

6. The arrangement of claim 5, wherein the sheet portions have outer surfaces that are open to shell air provided as an air supply for combustion in the plurality of combustors, and the sheet portions have impingement holes for passage of shell air as the impingement cooling air against the first and second side walls.

7. The arrangement of claim 5, wherein a thickness of at least one of the first and second side walls tapers to a reduced thickness along a length of the post impingement chamber to the convergence junction trailing edge.

8. The arrangement of claim 5, wherein each of the first and second side walls include an elongated rib located adjacent to the post impingement chamber and having an elongated dimension extending in an upstream to downstream direction, and including a movable seal extending between the elongated ribs and defining an upstream end of the post impingement chamber.

9. The arrangement of claim 8, including cooling air passages extending through each of the ribs and providing a flow of post impingement air from the impingement chambers to the post impingement chamber.

10. The arrangement of claim 8, including film cooling holes defined through the first and second side walls and providing film cooling air from the impingement chambers to sides of the first and second side walls that are exposed to the gas flow.

11. The arrangement of claim 8, herein a thickness of the first and second side walls tapers to a reduced thickness along a length of the post impingement chamber to the convergence junction trailing edge.

12. The arrangement of claim 5, wherein a downstream portion of the second side wall is formed integral with the IEP that defines the downstream flow path including the first side wall, and the second side wall has a downstream edge that terminates upstream of a downstream edge of the first side wall.

13. The arrangement of claim 12, wherein the second side wall includes an upstream portion formed integral with the IEP that defines the upstream flow path and the upstream portion of the second side wall is located adjacent to the downstream portion of the second side wall, and including a movable seal positioned between the upstream and downstream portions of the second side wall.

* * * * *